May 13, 1958
J. F. SAYE
2,834,142
FISHING FLOAT
Filed Jan. 22, 1957
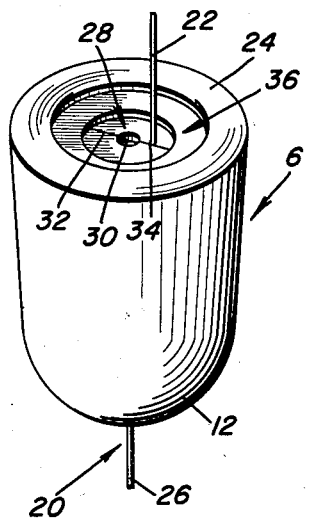
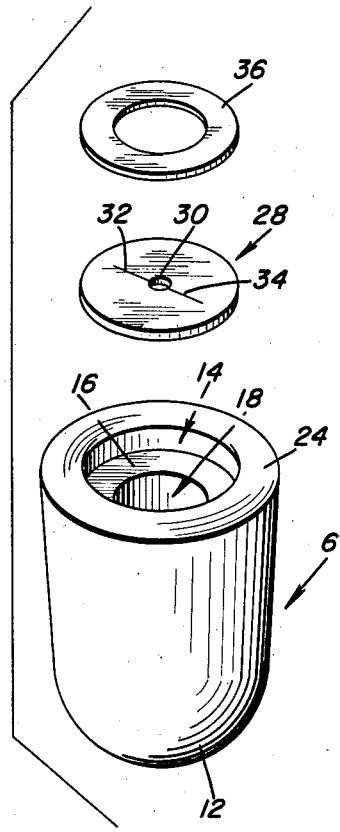
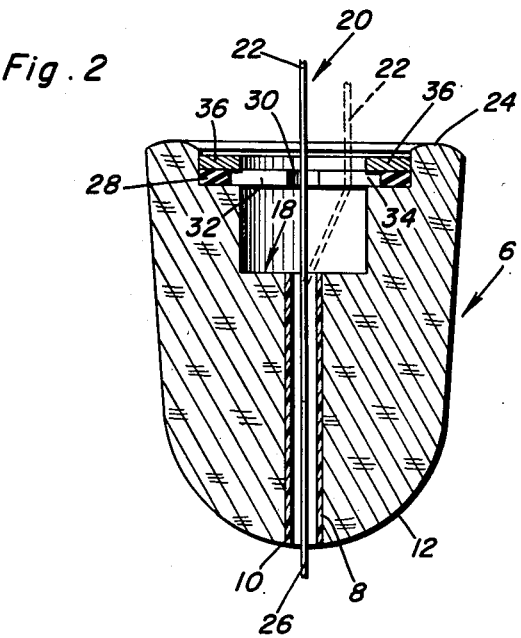
John F. Saye
INVENTOR.
BY
Attorneys

United States Patent Office 2,834,142
Patented May 13, 1958

2,834,142

FISHING FLOAT

John F. Saye, Forsyth, Mo., assignor, by mesne assignments, of one-quarter to Philip A. McCarthy and one-quarter to Edward M. McCarthy and Lenore W. McCarthy as joint owners Application January 22, 1957, Serial No. 635,187

3 Claims. (Cl. 43—44.87)

This invention relates to a fishing float having an axial fishing line passage through which the line is threaded and also having simple, practical and reliable means located at one end of the passage which allows the line to slide freely through the passage and alternatively functions, when it is brought into play, to releasably grip and connect the line to the float.

Briefly, the improved float comprises a buoyant plastic, cork, or an equivalent body of suitable size and shape. A fishing line passage extends axially through the float and the line is threaded therethrough in the customary manner. The upper end of the float is recessed to provide a shallow pocket and a rubber or an equivalent washer is seated in the pocket and clamped in its operative position by a ring which is lodged in the pocket in its operative position by a ring which is lodged in the pocket atop the washer. Diametrically opposite slits are cut in the washer and provide selectively usable friction-type line grips.

Constructed as above described a novel float is thus had which can be temporarily attached to the line and set for fishing at a desired depth or released by the controlled actuation of the line for free running of the line relative to the bobber.

The general object of the invention is to structurally, functionally and otherwise improve on analogous prior art fishing floats and which are intended to function in the general manner above set forth.

Other objects, features and advantages will become more readily apparent from the following description and the accompanying drawing.

In the drawing, wherein like numerals are employed to designate like parts throughout the views:

Fig. 1 is a perspective view of the novel fishing float;

Fig. 2 is an enlarged central sectional view in which the component parts are detailed; and Fig. 3 is an exploded perspective view.

In the drawings the body is denoted by the numeral 6 and is of suitable shape and size and, in practice, may be constructed from buoyant plastics, cork or any equivalent material which may be transformed into a float. As before mentioned the body has a passage extending axially therethrough. The main part of the passage is denoted at 8 and is lined with a plastic or an equivalent tube 10. The lower end of the passage opens through the convex lower end 12 of the float. The upper central portion of the float is recessed. As seen in Fig. 3 the upper recess is circular and relatively shallow and is denoted at 14. The bottom of the recess provides an annular ledge 16. This recess is herein referred to as a pocket and the inward or lower recess 18 is differentiated as a socket and communicates at its bottom with the upper end of the passage. It is to be stated that the expression "passage" is broadly used here to designate the complete passageway through the float from top to bottom which includes, of course, the recesses 14 and 18. The two recesses 14 and 18 communicate with each other and as is evident from the drawing the upper recess or pocket 14 is of a diameter appreciably greater than the cross-section or diameter of the recess 18. The latter in turn is of a greater cross-section than the aligned passage 8. The fishing line 20 is threaded through the passage with what may be called the upper portion 22 extending above the top 24 of the float and the lower portion 26 extending below the bottom where, as usual, it is intended to accommodate a sinker, hook, artificial bait or the like (not shown). The line may be said to be threaded or slidably mounted in the passage; or alternatively, the float may be said to be slidably mounted on the line.

Simple and practical means is mounted in the pocket or recess 14 and may be brought in play at will so that the float may be free of direct or positive connection with the line, or may be temporarily but positively engaged with the line in the manner brought out in full and dotted lines in Figs. 1 and 2. The means preferred comprises a rubber or an equivalent washer 28 which is seated on the ledge and confined in the pocket so that the central aperture or hole therein is in alignment with the passage 8 and also the socket 18. The washer is provided with one or more line seating slits which are denoted respectively by the numerals 32 and 34. Preferably there are two of these slits and they are diametrically opposite each other and their inner ends open into the hole or aperture 30. The outer ends are closed. These slits define friction-type line grips. The washer is held in place by a second washer or ring 36 which is lodged and appropriately secured in the pocket atop the washer 28. The washer 28 thus has its apertured slotted portion spanning the upper end or mouth portion of the socket 18. Thus constructed a fishing float is had which can be temporarily attached and set for fishing at a desired depth or released by controlled actuation of the fishing line for free running of the line relative to the float. The free running arrangement is seen in Fig. 2 for example with the line in the straight away central position appearing in full lines. Either slit serves so that when the line is intentionally and forcibly yanked, pulled and otherwise actuated it may be jerked into either slit as shown in full lines in Fig. 1 and in dotted lines in Fig. 2.

The construction shown satisfies the need for a fishing cork or float which may normally move freely along the fishing line. It provides, at the same time, a float or cork which can be set for any desired depth or released from the line by flipping the line with the aid of a fishing rod. When reeling in the fishing line the cork is released from the line when it comes up to and strikes against the tip at the outer end of the rod. It follows that the cork is fastened to the line by jerking the line into one of the slits in the rubber washer and is released by a reverse application of forces in the same general manner.

Changes in shape, size and rearrangement of parts may be resorted to in actual practice without departing from the spirit of the invention or scope of the invention as claimed.

What is claimed as new is as follows:

1. A fishing float comprising a buoyant body having an axial passage adapted to receive and retain a fishing line, the upper end of said body having centrally disposed recess means defining upper and lower recesses communicating with each other and also with said axial passage, the upper recess providing a pocket, the lower recess providing a line clearing and liberating socket, said pocket being of a cross-sectional diameter greater than the cross-sectional diameter of said socket, and a washer seated and retained in said pocket and having its centrally apertured portion spanning and covering the upper end of the socket, said washer having at least one radial slit closed at its outer end and open at its inner end and communicating with said aperture, said slit serving as a friction retaining line-grip when the line is intentionally and forcibly yanked, pulled, and seated in the slit.

2. The structure defined in claim 1 and wherein said washer is constructed of rubber so that the inherent yielding properties facilitate the act of jerking and seating the line in said slit or, when forces resulting from a reversed jerking action are brought about, permits disengaging the line from the slit.

3. A fishing float having an axial passage adapted to receive and retain a fishing line, the upper end of said float having centrally disposed recess means defining upper and lower recesses communicating with each other and also with said axial passage, the upper recess providing a pocket, and the lower recess providing a line clearing and liberating socket, said pocket being of a cross-sectional diameter greater than the cross-sectional diameter of said socket, a rubber washer seated in said pocket and having a centrally apertured portion spanning and covering the upper end of the socket, said washer having radial diametrically opposite slits formed therein and closed at their outer ends and having their inner ends open and communicating with said aperture, said slits serving as selectively usable friction retaining line grips when the line is intentionally and forcibly yanked, pulled and otewise jerked into the selected slit, and a ring superimposed on said washer and seated in said pocket and serving to retain the washer operatively in the pocket, said slits, in the main, being in alignment with said socket and said socket being of a cross-section appreciably greater than the cross-section of the passage, and the passage, socket, and aperture in the washer all being of a diameter appreciably greater than the cross-section of the fishing line which cooperates therewith.

References Cited in the file of this patent
UNITED STATES PATENTS

| | | |
|---|---|---|
| 992,341 | Davis | May 16, 1911 |
| 1,065,190 | Tobin | June 17, 1913 |